(No Model.)
L. RICHARDSON.
CAN.
No. 281,556. Patented July 17, 1883.
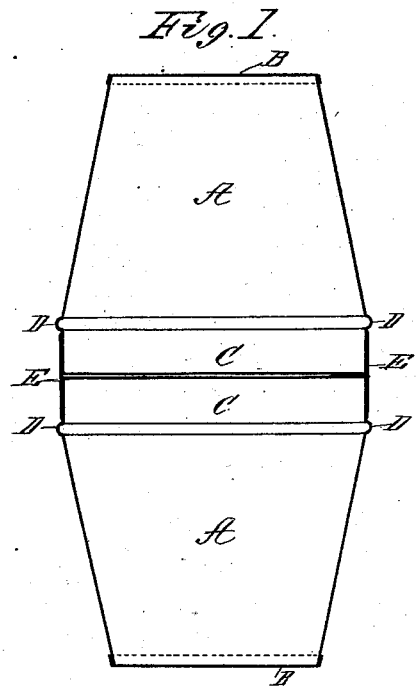
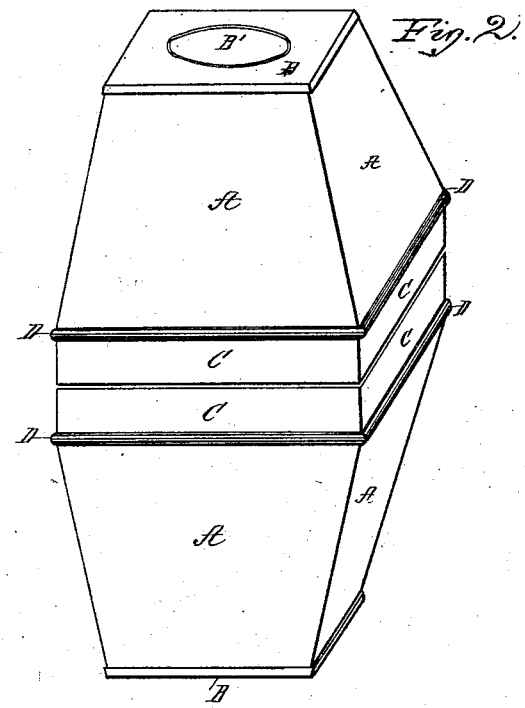
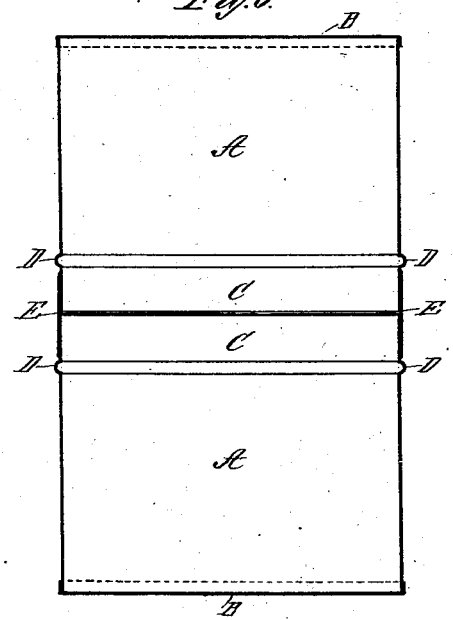
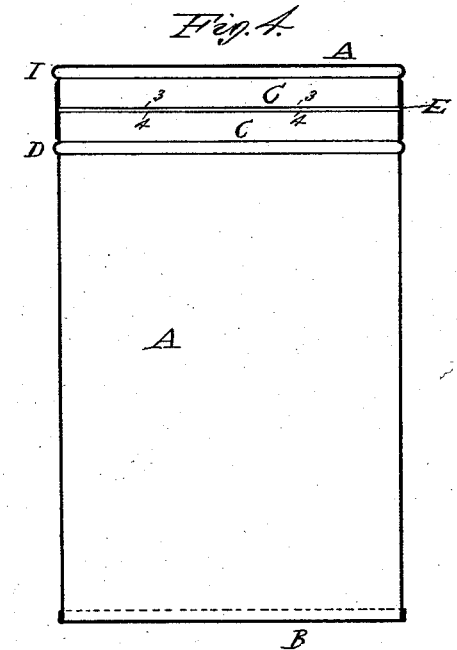
Witnesses:
John H. Ives
John J. Cauldwell
Inventor
Leonard Richardson
by Wetmore and Jenner his Attys.

UNITED STATES PATENT OFFICE.

LEONARD RICHARDSON, OF BROOKLYN, NEW YORK.

CAN.

SPECIFICATION forming part of Letters Patent No. 281,556, dated July 17, 1883.

Application filed April 18, 1883. (No model.)

*To all whom it may concern:*

Be it known that I, LEONARD RICHARDSON, a citizen of the United States, and a resident of Brooklyn, in the county of Kings and State of New York, have invented certain new and useful Improvements in Cans, of which the following is a specification.

Figure 1 is a side view of a circular can embodying my invention. Fig. 2 is a perspective view of a square can embodying my invention, but without sealing-strip. Fig. 3 is a vertical sectional view of my invention applied to a cylindrical can. Fig. 4 is a vertical sectional view of an ordinary cylindrical can embodying my improved method of sealing the joint between the cover and the can by the use of a sealing-strip wider than the surfaces which support it. Fig. 5 illustrates an old method of constructing the cover and the can at the point of contact and the method of applying the sealing-strip.

My invention relates to cans in which meat, vegetables, fish, paints, and like bodies may be hermetically sealed up for preservation until desired for use; and the principal features of it are as follows: First, I strengthen the can at the open ends thereof by the circumferential ribs or corrugations at or near the open ends; second, by the use of the ribs I supply guides whereby the sealing-strip may be more easily and accurately applied to the can, and which are also an aid to the workman in applying the soldering device, or the solder itself, if used in stick form without an iron; third, I prevent overlapping of the cover on the can, or vice versa, which has heretofore taken place when such a joint as that shown in Fig. 5 is made, between which overlapping parts—*i. e.*, between the parts marked 1 and 2—the solder is very apt to run, and thus, even after the sealing-strip has been pulled off, the two parts composing the can cannot be separated.

In Figs. 1 and 2, A A are two cups made in the shape of frustums of cones or pyramids. They form the two halves of the can. They may be square, round, or of any desired number of angles. B B are the bottoms of the cups, which bottoms form the heads of the can when it is put together. The contents are inserted through a hole in one of the heads, as seen at B', which is soldered up, as usual. At C C the sides of the cups are preferably diverted from the pyramidal or conical direction or line of the side, and are made parallel on opposite sides, so that the sealing-strip E may have a flat surface all around the can on which to rest. At the point where this change of direction takes place, I form on each of the cups a rib or welt, D D, which runs entirely around the cup. To put the can together, the two parts are brought up to one another, the open ends together, until the edges touch. Then a sealing-strip, E, of tin, preferably "taggers tin," so called, and which may be about as wide as the distance between the two ribs D D, (although I prefer to make it wider, as hereinafter set forth,) is soldered with soft solder all around the can, or, in other words, entirely around the meeting edges of the cups thus brought together, the ends of the sealing-strip overlapping each other, as usual in such manufacture. While soldering the taggers tin onto the can the ribs D D serve as a guide both to the tin and to the soldering-tool or stick of solder, if used without a soldering-iron. The sealing-strip may be soldered to the can by any desired method, either as above set forth, or soldered to one half first and then to the other half.

It will be noticed that, as above set forth, the edges of the two cups are simply brought up to each other, and that there is no overlapping or interlocking of one upon the other. This is a material feature in my invention, irrespective of the shape or construction otherwise of the can or cover. The peculiar advantage resulting from this construction is that the soft solder, even if it should be applied so heavily as to run into the crack between the cover and can, finds so little surface upon which to take hold, there being nothing but the edges of the tin, that when the strip of sealing-tin is removed the cover will not be fastened so securely but that it can be readily removed, and, if necessary, the point of a knife-blade being inserted into the crack at some open place therein and carried around the can will quickly and easily sever any such deposit of the soft solder, thus completely releasing the cover from all connection with the can.

In Fig. 3, I show my invention applied to a cylindrical can. A A are the cups with straight sides; B B, the heads; C C, the parallel parts for the reception of the sealing-strip; D D, the guiding-ribs, and E the sealing-strip. The special advantages resulting from this construction of a cylindrical can, which, however, are also found in the constructions shown in Figs. 1 and 2, are pre-eminently these: first, that the ribs D D afford stiffening for the can in its central part, whereby liability to indentation or to be knocked in on the side is diminished; and, second, that when the sealing-strip is removed the halves can be readily pulled apart, because each end of the can affords a firm hold for the hand, and also when one-half has been thus removed, if the contents of the can be prepared meat or any other tenacious substance which sticks in the can, then the protruding end of such contents affords a make-weight which aids in removing the other half from the other part of the can. This is a material advantage in cans designed to contain tenacious substances, such as pressed meats, fish, &c.

In Fig. 4, I have shown another part of my invention, which I propose to use in the construction of my above-described cans. It consists in making the sealing-strip somewhat wider than the combined width of the two flat spaces on which it rests, and I make the ribs or welts sufficiently abrupt to act as a stop to the strip, as well as a guide to it and the soldering-tool. The sealing-strip is first soldered to one-half of the can resting against the rib on it. There will then protrude beyond the edge of the flat part to which the strip is soldered a portion of the strip wider than the width of the flat part on the other half of the can, so that when the two halves are fitted together for the purpose of soldering the sealing-strip to the other half the outer edge of the sealing-strip will abut against and be stopped by the rib on the other half, thus preventing further telescoping or sliding together of the two halves, and this takes place before their edges have met, and the degree of such separation may be varied at will, depending solely on the relative width of the sealing-strip and the combined width of the surfaces outside of the ribs. This above construction I have shown in Fig 4, as applied to an ordinary can. A A are respectively the cover and body of the can. D D are the ribs on the cover and can, respectively; C C, the flat surfaces on which the sealing-strip rests. E is the sealing-strip, and 3 4 are respectively the separated edges of the flat surfaces.

I do not limit myself to the details of construction shown, since they may be considerably varied and still embody my invention.

I claim—

1. A can made of two cup-shaped parts of substantially equal capacity, each provided with the stiffening and sealing strip, guiding-rib D, and flat surface C, and the sealing-strip E, substantially as and for the purposes set forth.

2. The combination of the ribs D D, the flat surfaces C C, and the sealing-strip E wider than the combined width of the flat surfaces C C, substantially as and for the purposes set forth.

Signed at New York, in the county of New York, and State of New York, this 14th day of April, A. D. 1883.

LEONARD RICHARDSON.

Witnesses:
JOHN J. CAULDWELL,
JOHN J. O'BRIEN.